Aug. 16, 1955 R. T. TOWNSEND 2,715,427
FATTING ATTACHMENT FOR SKINNING MACHINES
Filed June 23, 1951
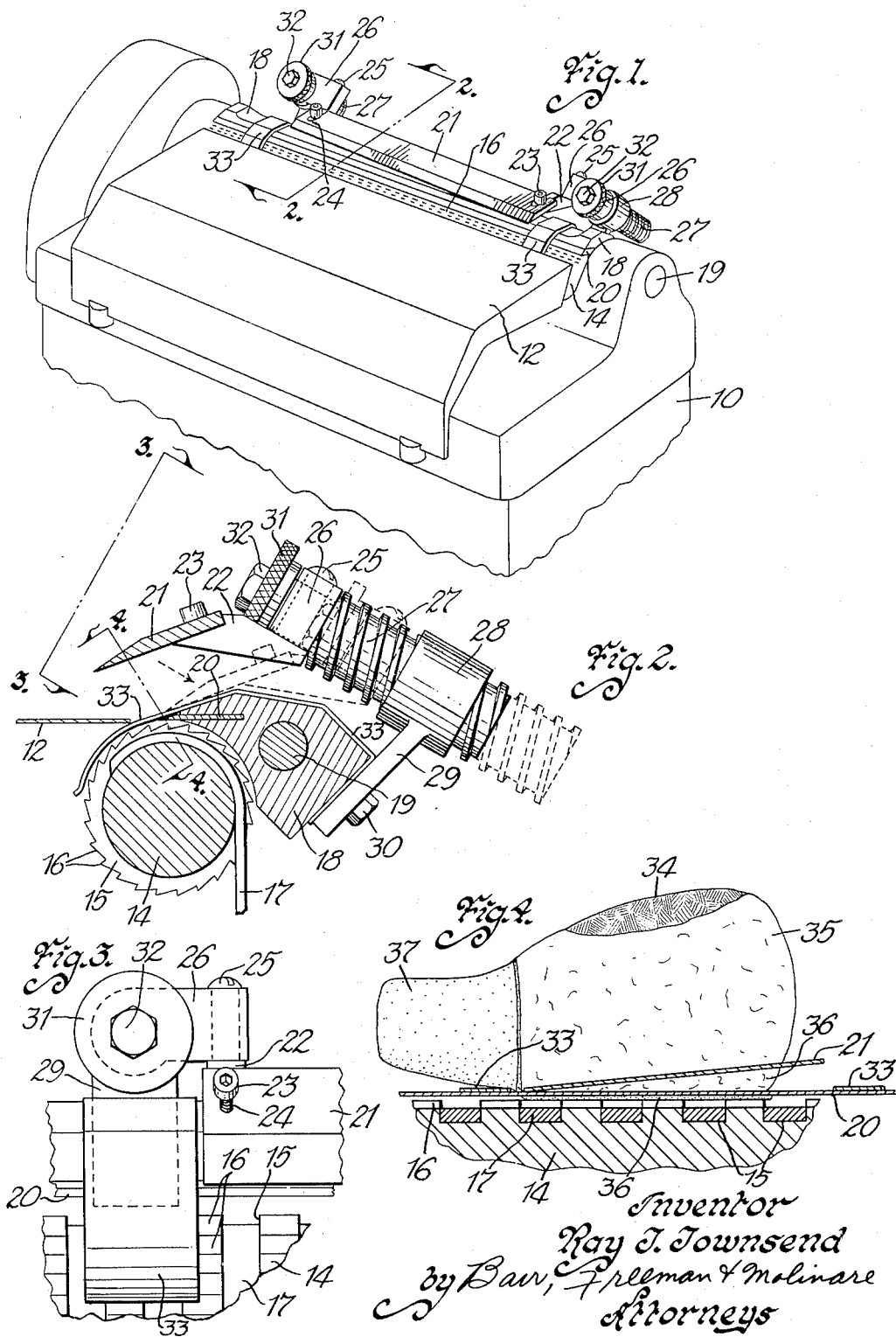

2,715,427

FATTING ATTACHMENT FOR SKINNING MACHINES

Ray T. Townsend, Des Moines, Iowa, assignor to Townsend Engineering Company, Des Moines, Iowa, a corporation of Iowa Application June 23, 1951, Serial No. 233,187

3 Claims. (Cl. 146—130)

This invention relates to a fatting attachment for a skinning machine of the type shown in my Patent No. Re. 23,222 of April 25, 1950, and is specifically for the purpose of removing fat as well as skin from a ham.

One object of the invention is to provide a fatting attachment in the form of a blade mounted on the skinning machine in position for removing a layer of fat from a ham being skinned, the two operations being simultaneously performed.

Another object is to provide a fatting attachment which is comparatively simple and inexpensive to manufacture, and which may be readily attached to the existing skinning machines without alteration therein.

Still another object is to provide a quick-acting screw-threaded adjusting means for the fatting blade so that the operator may quickly adjust the blade for the thickness of fat on different hams as they come to him for skinning and fatting and the adjustment will be retained without the necessity of providing a locking means therefor.

A further object is to provide a fatting blade which is adjustable at each end so that one end may remove a minimum amount of fat and the other end a maximum amount of fat as found at the collar and butt ends, respectively, of a ham, the arrangement being such that either a right-hand or a left-hand ham may be properly fatted.

A still further object is to provide a guard to be used in conjunction with my fatting blade for preventing skinning of the collar of the ham, such guard being duplicated in the machine for operating on either right- or left-hand hams, as the case may be.

With these and other objects in view, my invention consists in the construction, arrangement, and combination of the various parts of my fatting attachment whereby the objects contemplated are attained, as hereinafter more fully set forth, pointed out in my claims, and illustrated in the accompanying drawings, wherein:

Figure 1 is a perspective view of the top portion of a skinning machine such as the type shown in my patent above referred to, and illustrating in connection therewith my fatting attachment.

Figure 2 is an enlarged vertical sectional view on the line 2—2 of Figure 1, the attachment being shown shaded and the skinning machine unshaded.

Figure 3 is a fragmentary detail looking in the direction of the arrows of the line 3—3 of Figure 2; and Figure 4 is a sectional view on the line 4—4 of Figure 2 in which there is shown a ham in position to be treated.

On the accompanying drawing I have used the reference numeral 10 to indicate in general the skinning machine frame. A feed table 12 surmounts the frame 10 and a feed roll 14 is rotatably mounted within the frame 10 and below the table as shown in Figure 2.

The feed roll 14 is provided with peripheral grooves 15 and teeth 16 projecting to engage the skin of the ham, which skin is then stripped off by strippers 17 stationarily mounted and located in the grooves 15.

A pressure shoe 18 follows a portion of the periphery of the feed roll 14 and is rockably mounted on a shoe rock shaft 19. The pressure shoe carries a skinning blade 20, all of which features thus far described are shown more in detail in my patent above referred to.

In addition to skinning hams, it is quite often desirable to "fat" them. Without a fatting attachment on the skinning machine the fatting of the ham is performed either in some other machine or by hand. The attachment of my present invention for fatting the ham simultaneously with the skinning operation will now be described.

The fatting attachment includes a fatting blade 21 which is mounted on a pair of supporting brackets 22, one at each end of the blade, by means of clamp screws 23. The screws pass through slots 24 of the blade 21 and are threaded into the brackets 22 to permit of clamping the blade in position after the desired adjustment of the blade relative to the brackets as permitted by the slots 24.

Each bracket 22 has a pivot 25 projecting upwardly therefrom which pivot is oscillatable in a pivot block 26. The pivot block 26 is supported on the reduced upper end of an adjusting screw 27 which screw is threaded in a boss 28 and will stay in any adjusted position without the necessity of providing a locking means therefor. The boss 28 is part of a mounting bracket 29 mounted on the pressure shoe 18 by means of a mounting screw 30, there being one bracket 29 for each end of the pressure shoe. An adjusting knob 31 for the screw 27 is provided and may be connected to the reduced upper end of the screw by a clamp screw 32.

Interposed between the brackets 29 and the pressure shoe 18 I provide a pair of guards 33, the purpose of which will hereinafter appear. These pass over the top of the pressure shoe, across the skinning blade 20 and extend under the feed table 12, as shown in Figure 2.

Practical operation

Having described the constructional details of my fatting attachment, I will now describe the operation, both of fatting and skinning a ham. In Figure 4 I illustrated a ham 34 with fat 35 thereon and skin 36 being removed from the ham by the skinning blade 20. As shown in my prior patent the teeth 16 grip the skin and pull it under the blade 20 and between the teeth and the pressure shoe 18, the skin then being stripped away from the feed roll 14 by the strippers 17.

When my fatting blade 21 is attached to the machine, it will simultaneously remove a layer of fat 36 which will pass between the blade 21 and the pressure shoe 18 and over the top of the skinning blade 20 and the pressure shoe to be discharged from the right-hand edge of the shoe in Figure 2. The fat 35 on ham varies in thickness, being considerably thicker at the butt end (the right-hand end of Figure 4) than at the shank end of the ham. Therefore, it is desirable to have the blade 21 in contact (or nearly so) with the blade 20 as shown at the left side of Figure 4 and by dotted lines in Figure 2. The right-hand end of the fatting blade 21 is then elevated above the skinning blade as shown at the right side of Figure 4 and by solid lines in Figure 2, to remove a progressively thicker piece of fat from the ham—that is, progressively thicker from the collar end to the butt end.

Hams are right and left-hand, and it is desirable to feed a right-hand ham with the shank at the left, as shown in Figure 4, and a left-hand ham with the shank at the right. For that reason the ends of the fatting blade 21 are individually adjustable so that the blade can be slanted in the opposite direction in Figure 4 when fatting a right-hand ham. At the same time, it is desirable to provide an adjustment that can be quickly operated and which does not require a separate locking means that has to be also operated. Therefore, I have used threaded adjustments 27 wherein the use of threads eliminates the necessity of locking means or may be considered "self-locking" as are all conventional threads. The threads are preferably high-pitch so as to effect a quick adjustment. For instance, it takes less than two turns of the knob 31 to adjust from the solid line position of Figure 2 to the dotted line position.

As successive hams come to the operator for being skinned and fatted, he will find that the thickness of the fat varies. As he picks up a ham he can quickly set the fatting blade adjustment to take off the amount of fat he estimates is necessary.

My fatting attachment is ordinarily used only on hams that are partially skinned; that is, those that have a collar 37 of skin left on the shank. To leave the collar 37 instead of taking off the entire skin, the guards 33 are provided which, as shown on the left side of Figure 4, prevent the skin to the left of the right-hand edge of the guard from being removed by the skinning blade 20. The guard prevents the skin from being fed under the blade at this edge and the blade goes through the skin, leaving the collar 37 on the shank of the ham 34.

When working on left-hand hams, the fatting blade 21 is adjusted to the opposite slant and the right-hand guard 33 is then effective to leave the skin collar 37 on the shank. The guards thus limit the amount of skin taken off the ham, the operator properly positioning the ham with respect to the guard at the low end of the fatting blade 21 so as to stop the collar at the desired line around the shank.

From the foregoing specification, it will be obvious that I have provided a fatting attachment that can be quickly mounted or demounted as desired with respect to a skinning machine and which is quickly adjustable for different thicknesses of fat found on successive hams. Also the ends are individually adjustable so that a different thickness of fat can be removed from opposite ends of the ham. An operator, after gaining experience with the fatting attachment, becomes very proficient in adjusting the blade in a minimum of time for taking off the proper amount of fat, and for working on right or left-hand hams, as the case may be. The adjustment of the fatting blade is quick and positive in action and once adjusted retains that adjustment until a change in the blade angle is manually made for a different thickness of fat.

Some changes may be made in the construction and arrangement of the parts of my attachment without departing from the real spirit and purpose of my invention, and it is my intention to cover by my claims any modified forms of structure or use of mechanical equivalents which may be reasonably included within their scope.

I claim as my invention:

1. A fatting attachment for skinning machines, comprising a rigid fatting blade, means for mounting said fatting blade on the skinning machine adjacent a skinning blade thereof so that each end of the fatting blade is adjustable toward or away from the skinning blade to vary its depth in the fat independent of the other end of the fatting blade, said means comprising brackets at opposite ends of the fatting blade and supported on the machine, screw elements threaded in said brackets, and pivot blocks carried thereby and connecting the ends of said rigid fatting blade to said screw elements.

2. In a fatting attachment for a skinning machine having a pressure shoe and a feed roller between which the skin passes, a bracket for mounting on and adjacent each end of said pressure shoe and skinning blade of the machine, an adjusting screw threaded in each bracket having high-pitch threads for quick adjustment, a supporting bracket pivoted to each adjusting screw, and a rigid fatting blade connected at its ends to said supporting brackets and adjustable thereby as to the depth of either of its ends in the fat.

3. In a fatting attachment for skinning machines, a pair of brackets for mounting, one on and adjacent each end of a pressure shoe and skinning blade of the machine, an adjusting screw threaded in each bracket having high-pitch threads for quick adjustment, a supporting bracket pivoted to each adjusting screw, a rigid fatting blade connected at its ends to said supporting brackets and supported thereby, and a pair of collar guards interposed between said mounting brackets and said pressure shoe and passing over the skinning blade.

References Cited in the file of this patent

UNITED STATES PATENTS

| | | |
|---|---|---|
| Re. 23,222 | Townsend | Apr. 25, 1950 |
| 782,992 | Schmidt et al. | Feb. 21, 1905 |
| 971,546 | Mayer | Oct. 4, 1910 |
| 2,261,589 | Piper | Nov. 4, 1941 |